(12) United States Patent
Vicente et al.

(10) Patent No.: US 8,270,136 B2
(45) Date of Patent: Sep. 18, 2012

(54) CIRCUIT BREAKER ZONE SELECTIVE INTERLOCK FOR DIFFERENTIATED FAULTS AND METHOD OF OPERATION

(75) Inventors: Nataniel Barbosa Vicente, Prospect, KY (US); Mark Fredrick Culler, Prospect, KY (US); Brian Patrick Lenhart, Jr., Louisville, KY (US); Marcelo Esteban Valdes, Burlington, CT (US)

(73) Assignee: General Electric Company, Schenectady, NY (US)

( * ) Notice: Subject to any disclaimer, the term of this patent is extended or adjusted under 35 U.S.C. 154(b) by 1191 days.

(21) Appl. No.: 12/103,303

(22) Filed: Apr. 15, 2008

(65) Prior Publication Data

US 2009/0257158 A1 Oct. 15, 2009

(51) Int. Cl.
*H02H 3/08* (2006.01)

(52) U.S. Cl. .......... 361/93.2; 361/93.1; 361/96
(58) Field of Classification Search .......... None
See application file for complete search history.

(56) References Cited

U.S. PATENT DOCUMENTS

| 4,266,259 | A | * | 5/1981 | Howell | 361/97 |
| 5,872,722 | A | * | 2/1999 | Oravetz et al. | 700/292 |
| 5,905,615 | A | * | 5/1999 | Rivetti et al. | 361/63 |
| 6,297,939 | B1 | | 10/2001 | Bilac et al. | |

* cited by examiner

*Primary Examiner* — Jared Fureman
*Assistant Examiner* — Terrence Willoughby
(74) *Attorney, Agent, or Firm* — Cantor Colburn LLP

(57) ABSTRACT

A circuit breaker system and method having zone selective interlock features is provided. The system and method include the transmission of a selective interlock signal from a downstream circuit breaker to an upstream circuit breaker in the event a first or second fault condition is detected. The upstream circuit breaker upon receipt of this signal changes the response of the second circuit breaker depending on whether the first or second fault condition has been detected.

5 Claims, 5 Drawing Sheets

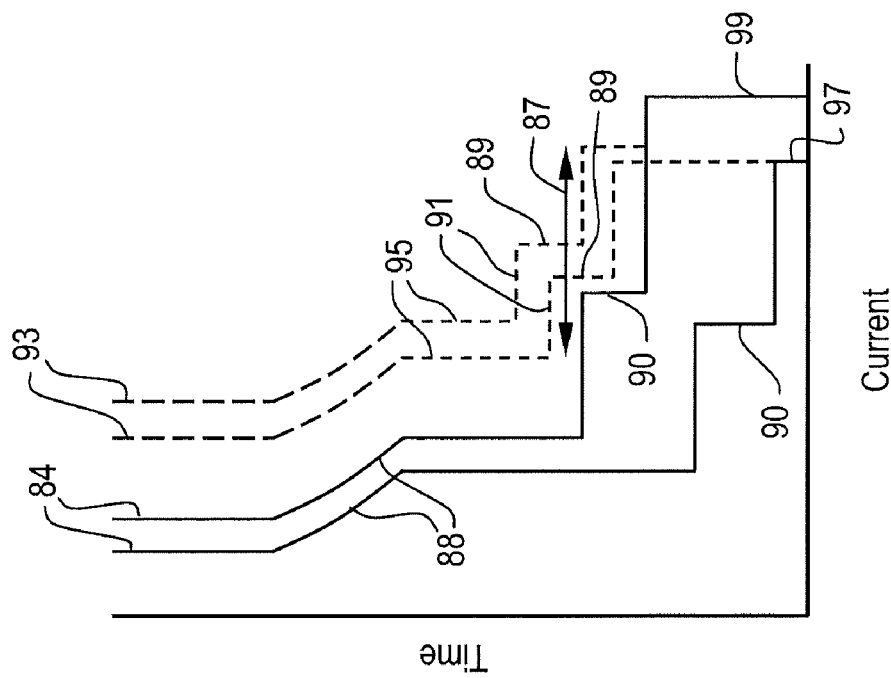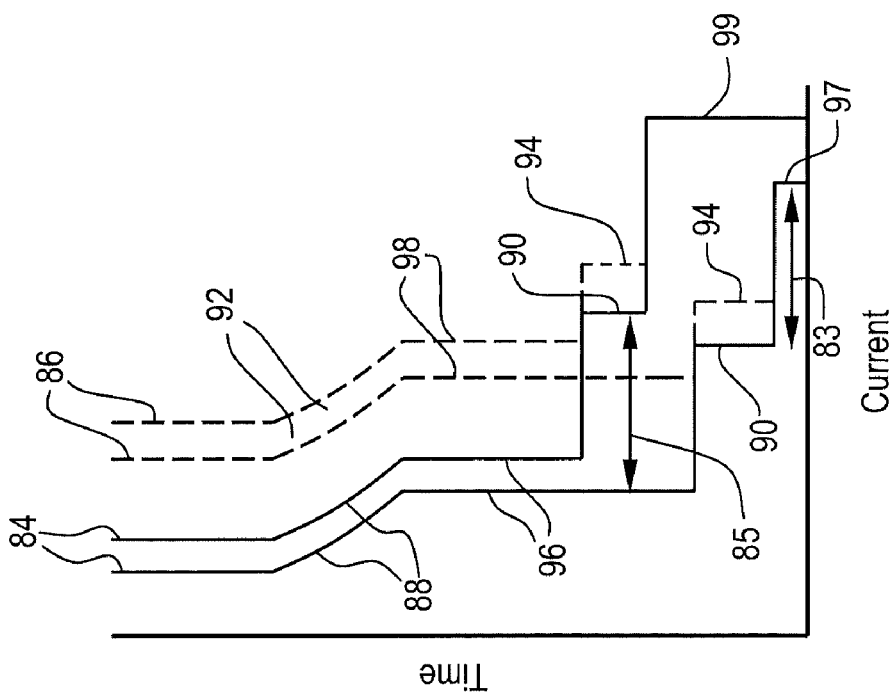

CIRCUIT BREAKER ZONE SELECTIVE INTERLOCK FOR DIFFERENTIATED FAULTS AND METHOD OF OPERATION

BACKGROUND OF THE INVENTION

The subject matter disclosed herein relates to a system for providing zone selective interlock between circuit breakers in an electrical distribution system. In particular, the subject matter disclosed herein relates to a system for zone selective interlock between a downstream circuit breaker and an upstream circuit breaker during instantaneous trip conditions.

Air circuit breakers are commonly used in electrical distribution systems. A typical air circuit breaker ("ACB") comprises an assembly of components for connecting an electrical power source to a consumer of electrical power called a load. The electric circuit the circuit breaker is connected to is referred to herein as the protected electric circuit. The components are referred to as a main contact assembly. In this assembly, a main contact is typically either opened, interrupting a path for power to travel from the source to the load, or closed, providing a path for power to travel from the source to the load. The ACB will further include devices and sensors, referred to as a trip unit, capable of sensing the current flowing through to the protected circuit and comparing the magnitude of the sensed current against predetermined thresholds. The trip unit's thresholds and current magnitude trip characteristics are displayed in a graphical form, commonly referred to as a "trip curve," which indicates to a user how long the trip unit will take to trip under any given overload condition. Upon detection of an overcurrent fault condition on the protected circuit outside of the trip curve parameters, the trip unit activates the mechanical linkages that cause the main contact assembly to open.

Downstream from the ACB, other ACBs or, one, or more smaller capacity circuit breakers, sometimes referred to as molded case circuit breakers ("MCCB's"), may be installed to further protect and isolate portions of the electrical distribution system. The MCCB's are available in multiple capacities and are often arranged in tiers or levels, with multiple MCCB's being arranged within each tier. The MCCB's, similar to the air circuit breaker, include a main contact assembly that is opened and closed via a mechanical linkage assembly. A trip unit associated with each MCCB senses current flowing through that portion of the protected circuit. Similar to the ACB, the MCCB utilizes trip curves to determine when a given condition is outside the desired parameters.

Since both the ACB and the MCCB react to fault conditions, circumstances may arise where an electrical fault causes both the ACB and MCCB to open their respective contact assemblies simultaneously. In general, it is desirable to have the circuit breaker closest to the fault interrupt the fault current, commonly referred to as tripping, such that the smallest portion of the protected circuit, closest to the fault is interrupted. The portion of the circuit bounded by its source circuit breakers and any circuit breakers exiting the circuit is called the zone of protection for the source circuit breakers. If the zone becomes faulted it is called the faulted zone. Interrupting the fault current close to the fault prevents, or at least minimizes the amount of disruption on other operations connected to other protected circuits. To avoid having the upstream ACB or an upstream MCCB trip, the system of circuit breakers on the protected circuit is coordinated. Through selective coordination, the trip curves of each circuit breaker are adjusted to allow the downstream circuit breaker the opportunity to trip first without jeopardizing the functionality of the circuit breaker system above the faulted zone.

While existing circuit breakers coordinated using cascaded time delays are suitable for their intended purposes, there still remains a need for improvements particularly regarding the speed of the circuit breakers protecting electrical circuits, and to minimize damage and risk it is important to interrupt a fault as fast as possible.

SUMMARY OF THE INVENTION

A circuit breaker system is provided having a first circuit breaker having a first trip unit. The first trip unit includes a first processor and a first current sensor electrically coupled to the first processor. A first data communications device coupled to transmit a signal from the first processor wherein the first processor is responsive to executable computer instructions for transmitting a signal through the first data communications device in response to detecting a first fault condition with the first current sensor. The first processor is further responsive to executable computer instructions for transmitting the signal through the first data communications device in response to detecting a second fault condition with the first current sensor.

A second circuit breaker is further provided in the circuit breaker system having a second trip unit. The second trip unit has a second processor and a second current sensor electrically coupled to the second processor. A second data communications device is operably coupled to receive the signal from the first communications device and transmit the signal to said second processor. Wherein the second processor is responsive to executable computer instructions for changing the tripping response of the second circuit breaker to a first interlock sequence if the signal is due to the first fault condition and to a second interlock sequence if the signal is due to the second fault condition.

A circuit breaker zone selective interlock system is further provided. The zone selective interlock system includes a first current sensor. A first processor is electrically coupled to the first current sensor where the first processor is responsive to computer executable instructions to transmit an interlock signal in response to detecting a first fault condition with said first current sensor. The first processor is further responsive to executable computer instructions for transmitting the signal in response to detecting a second fault condition with the first current sensor. Wherein the first processor is further responsive to computer executable instructions to trip a first circuit breaker in response to detecting the predefined fault level.

The circuit breaker zone selective interlock system further includes a second current sensor. A second processor is electrically coupled to the second current sensor and coupled for communication to the first processor. The second processor is responsive to executable computer instructions to change to a trip curve parameters in response to receiving the signal due to the first fault condition and delaying a tripping response in response to receiving the signal due to the second fault condition. Wherein the second processor is further responsive to executable computer instructions to trip a second circuit breaker in response to the second current sensor detecting a current level at or above an instantaneous trip threshold parameter.

A method of operating a circuit breaker system connected to a protected circuit is also provided. The method includes detecting an electrical fault with a first trip unit in a first circuit breaker. Determining if the electrical fault satisfies a first threshold parameter. Determining if the electrical fault satisfies a second threshold parameter. Determining if the electrical fault is above a first instantaneous trip level parameter. Transmitting an interlock signal to a second trip unit in a second circuit breaker if the first threshold parameter or the second threshold parameter have been satisfied. Tripping the first circuit breaker to interrupt current flow to the protected circuit. Receiving the interlock signal with a second trip unit in a second circuit breaker. Initiating a first interlock sequence in the second trip unit if the first threshold parameter has been satisfied. Finally initiating a second interlock sequence in the second trip unit if the second threshold parameter has been satisfied.

BRIEF DESCRIPTION OF THE DRAWINGS

Referring now to the drawings, which are meant to be exemplary and not limiting, and wherein like elements are numbered alike:

FIG. 3 is an illustration of an exemplary circuit breaker trip curve;

FIG. 4 is an illustration of an exemplary circuit breaker trip curve in an zone selective interlock mode of operation;

DETAILED DESCRIPTION

Figure 1:
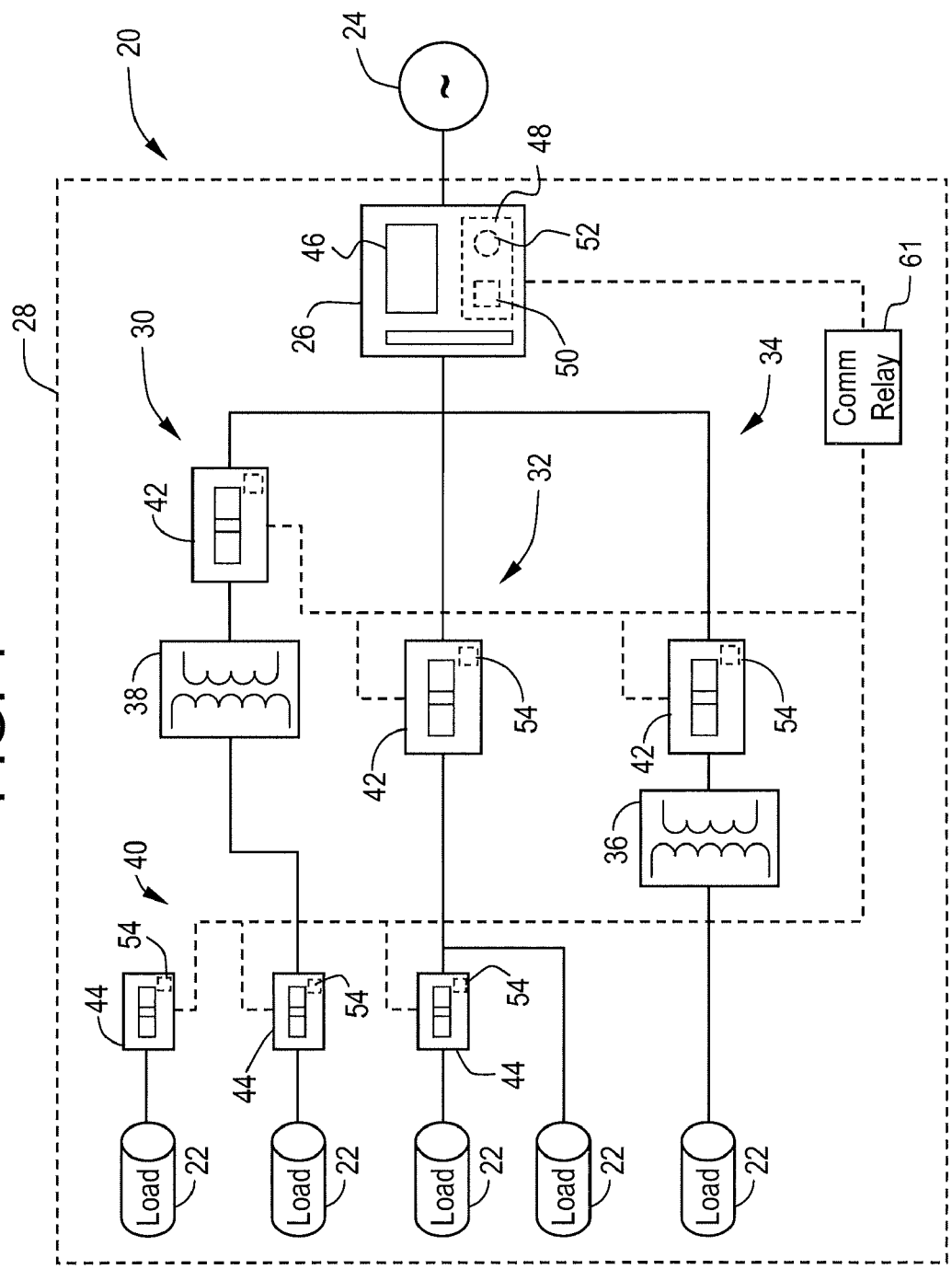
FIG. 1 is a schematic illustration of a protected electric circuit having a system of circuit breakers in accordance with an exemplary embodiment.

FIG. 1 illustrates a system of circuit breakers 20 connected to a protected electrical circuit serving loads 22 within a facility 28. An electrical power source 24, such as a utility electrical grid for example, is connected to a circuit breaker 26. Circuit breaker 26 is typically located at a service entrance for the facility 28. In a large facility, such as in the exemplary embodiment, the circuit breaker 26 is an air circuit breaker ("ACB") having the capability and capacity for connecting to three electrical phases from the power source 24 and distributing the power to different sub-circuits within the facility. The electrical loads 22 may be any type of load, including but not limited to lighting systems, process motors, data centers, heating and ventilation systems and the like.

Downstream from ACB 26, the protected circuit branches into multiple sub-circuits 30, 32, 34. These sub-circuits may include additional electrical distribution and control equipment such as transformers 36, 38 that adapt the electrical characteristics of the supplied electrical power to have the characteristics needed by the respective loads. The transformer 38 may step-down the voltage to 120V for use by a lighting circuit for example. Each of the sub-circuits 30, 32, 34 may be further sub-divided into even more refined low tier sub-circuits 40. The sub-circuits may include further electrical control devices, including but not limited to fuses and contactors for example. It should be appreciated the number of sub-circuits and tiers of sub-circuits may be numerous and that the illustration of FIG. 1 is intended to be exemplary and not limiting.

Each tier of sub-circuits generally initiates with a circuit breaker, such as circuit breaker 42 or circuit breaker 44 for example. Each circuit breaker 44 is electrically connected to receive electrical power from the ACB 26. In the exemplary embodiment, these lower tier circuit breakers 42, 44 are molded case circuit breakers ("MCCB"). Each MCCB may be either single phase or multiphase depending on the requirements of the downstream load 22 connected the MCCB. It should be appreciated that while the terms ACB and MCCB are used herein with reference to exemplary embodiments, the claimed invention is not so limited. For purposes of clarity, the terms ACB and MCCB are used herein, however, such circuit breakers are interchangeable and such interchanablility is within the scope of the claimed invention.

The ACB 26 includes a user interface 46 that may include a display and an input device, such as a keyboard. The display may be an LED (light-emitting diode) display, an LCD (liquid-crystal diode) display, a CRT (cathode ray tube) display, or the like. The user interface 46 allows the operator to observe the operating conditions and state of the ACB 26, such as the voltage and current received from the power source 24 for example, or the position of the contacts for example. The user interface 26 further allows the operator to change various operating parameters of the ACB 26. As will be discussed in more detail below, the user interface 26 allows the operator to adjust a user defined trip curve, define pick up thresholds, identify that zone selective operation is desired and what type of protection shall be interlocked, and delay timing to provide coordination and a zone selective interlock with the circuit breakers 42, 44 in the lower tier circuits.

The ACB 26 further includes a trip unit 48 having a processor 50 and a current sensor system 52. The trip unit is operably coupled to receive instructions from the user interface 26 and activate the ACB's operating mechanism (not shown). Alternatively, the processor 50 may also accept instructions through user interface, or through other means such as but not limited to electronic data card, voice activation means, manually-operable selection and control means, radiated wavelength and electronic or electrical transfer.

As will be discussed below, the trip unit 48 monitors the condition of the electrical power flowing through the circuit breaker. The processor 50 compares electrical characteristics of the electrical current measured by current sensor 52 to predetermined parameters. In the exemplary embodiment, the predetermined parameters are a function of time and current level, as defined by one or more trip curves as illustrated in FIG. 3 and FIG. 4. In the event the electrical characteristics are outside the predetermined parameters, the processor activates the operating mechanism causing the contacts to open and interrupt electrical power into the protected circuit.

Similar to the ACB, the downstream lower tier MCCB's 42, 44 include a trip unit 54 having a processor and a current sensor. The trip units 54 are arranged to monitor the electrical current flowing through the respective MCCB 42, 44 and into the lower tier sub-circuit 40. Each MCCB 42, 44 will further include a user interface (not shown) that allows the operator to monitor the condition of the MCCB 42, 44 and adjust user definable settings, such as a trip curve. The user interface of the MCCB 42, 44 may include a display and keyboard as with the ACB 26. Alternatively, the user interface of the MCCB 42, 44 may be a selector switch that allows the operator to select between different factory set parameters.

The trip units 48, 54 will be described in reference to FIG. 2. It should be appreciated that trip units 48, 54 may be differing substantially in construction, however, for exemplary purposes the trip units 48, 54 will be described in terms of their common functional components. The processor 50 is a suitable electronic device capable of accepting data and instructions, executing the instructions to process the data, and presenting the results, such as through user interface 46 for example. Processor 50 can be a microprocessor, microcomputer, a minicomputer, an optical computer, a board computer, a complex instruction set computer, an ASIC (application specific integrated circuit), a reduced instruction set computer (RISC), an analog computer, a digital computer, a molecular computer, a quantum computer, a cellular computer, a superconducting computer, a supercomputer, a solid-state computer, a single-board computer, a buffered computer, a computer network, a desktop computer, a laptop computer, or a hybrid of any of the foregoing.

Processor 50 is capable of converting the analog voltage or current level provided by current sensor 52 into a digital signal indicative of the level of electrical current flowing through conductor 56. Alternatively, current sensor 52 may be configured to provide a digital signal to processor 50, or an analog-to-digital (A/D) converter 58 may be coupled between current sensor 52 and processor 50 to convert the analog signal provided by current sensor 52 into a digital signal for processing by processor 50. Processor 50 uses digital signals act as input to various processes for controlling the circuit breaker. The digital signals represent one or more system 20 data including but not limited to interlock signals, main contact position, closing spring position and the like.

Figure 2:
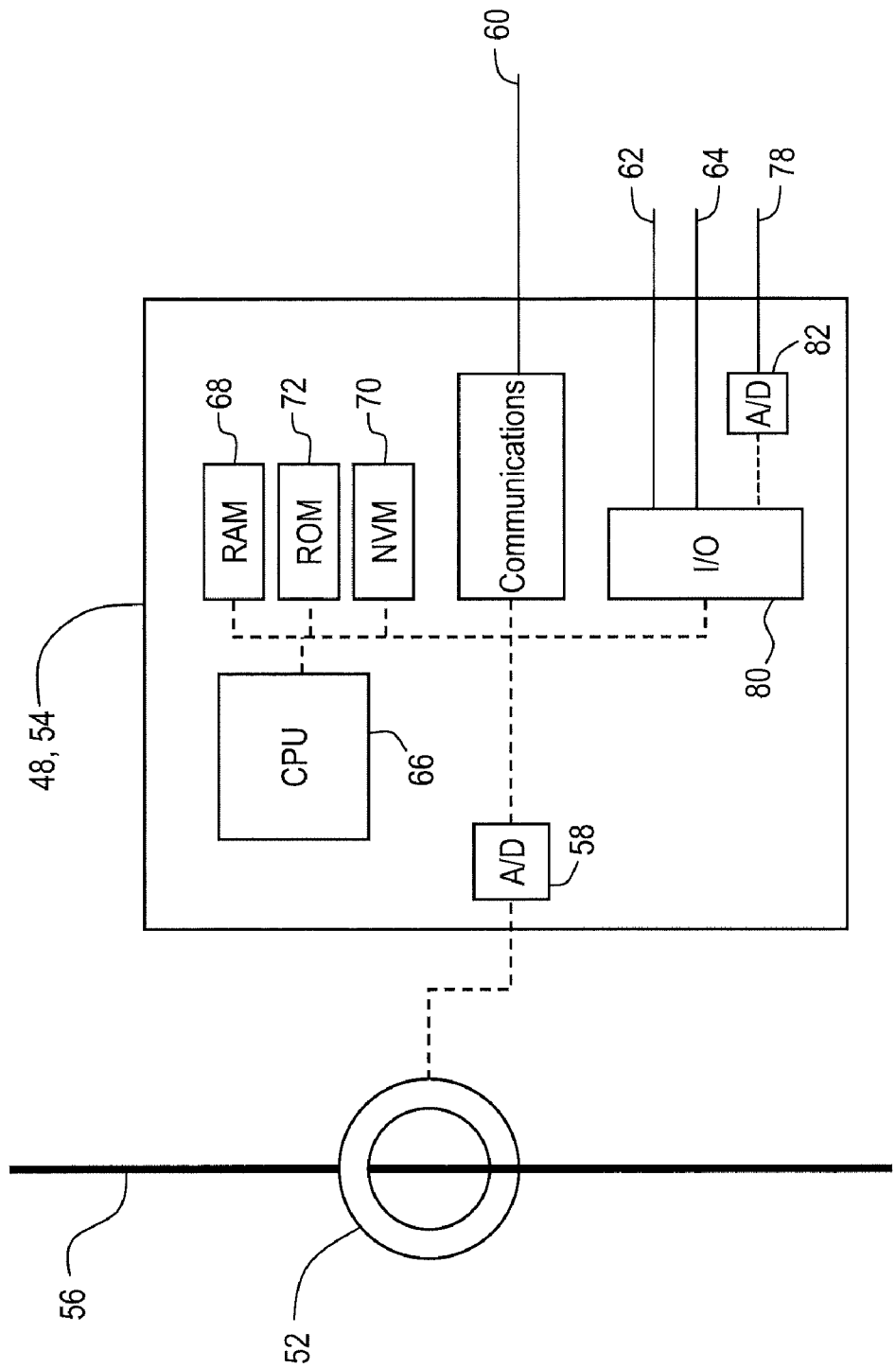
FIG. 2 is a schematic illustration of a circuit breaker trip unit in accordance with an exemplary embodiment.
Figure 5:
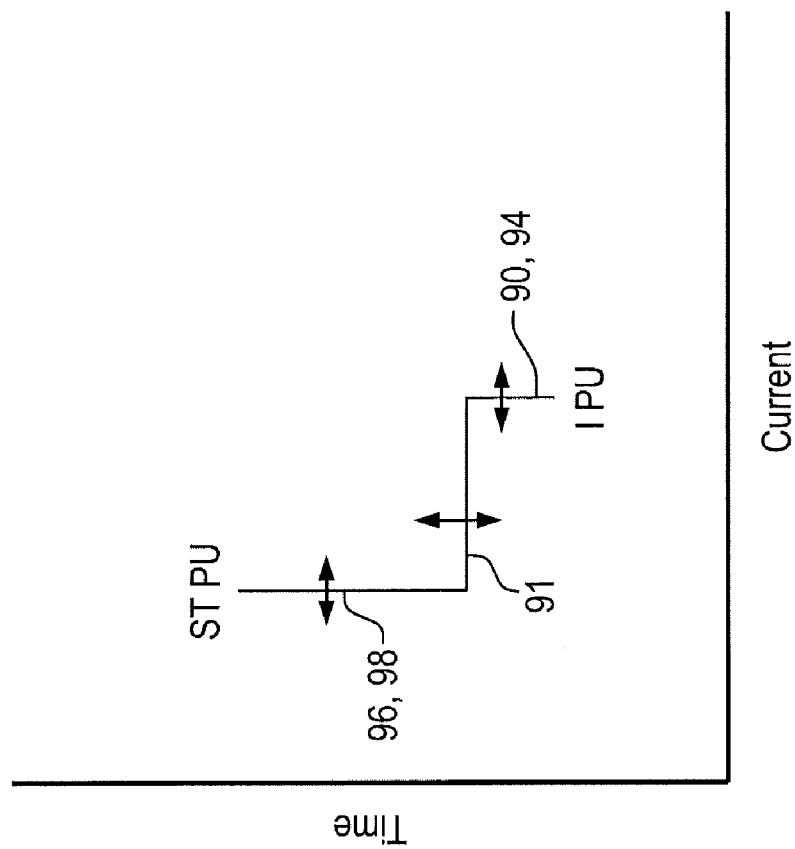
FIG. 5 is a schematic illustration of an circuit breaker trip curve adjustment diagram; and, FIG. 6 is a flow chart illustration of the operation of a downstream circuit breaker and an upstream circuit breaker in accordance with an exemplary embodiment.

It should be appreciated that while only one current sensor 52 and conductor 56 are illustrated in FIG. 2 and discussed herein, the circuit breakers 26, 42, 44 will typically have one such current sensor 52 for each electrical phase, or "pole" of the circuit breaker. Each pole of a circuit breaker carries electrical current for a single electrical phase. In a "multipole" circuit breaker, such as ACB 26 for example, the circuit breaker will have several poles, typically three or four, each carrying a different phase of electricity through the circuit breaker. Each of the poles is individually connected to the main contacts for each pole and its respective operating mechanism.

As will be discussed in more detail below, the processor 50 is operably coupled with one or more components of system 20 by data transmission media 60. Data transmission media 60 includes, but is not limited to, twisted pair wiring, coaxial cable, and fiber optic cable. Data transmission media 60 also includes, but is not limited to, wireless, radio and infrared signal transmission systems, using a protocol such as IEEE 802.11 for example. Data transmission media 60 may also include one or more data relays 61 that aggregate sections of data transmission media 60 to minimize the number of connections to the upstream circuit breaker trip units. In the embodiment shown in FIG. 1, transmission media 60 couples the ACB 26 to the lower tier circuit breakers 42, 44. Processor 50 is configured to provide operating signals and to receive data via data transmission media 60.

In general, processor 50 accepts data from current sensor 52, and is given certain instructions for the purpose of comparing the data from current sensor 52 to predetermined operational parameters. Processor 50 provides operating signals to actuation devices for the circuit breaker operating mechanism. Processor 50 may also accepts data from other sensors within the circuit breaker, indicating, for example, the position of the operating mechanism. The processor 50 compares the operational parameters to predetermined variances (e.g. current and time) and if the predetermined variance is exceeded, generates a signal that may be used to indicate an alarm to an operator or to activate the operating mechanism causing the main contacts to open. Additionally, the signal may initiate other control methods that adapt the operation of the system 20 such as coordinating the response between the downstream circuit breaker 42, 44 and the upstream circuit breaker, such as ACB 26 for example, to compensate for the out of variance operating parameter. For example, if a current sensor 52 in a MCCB 42 detects a current condition above a predetermined threshold, this may indicate a short circuit electrical fault condition. As will be described in more detail below, to prevent the upstream circuit breaker, such as ACB 26 for example, from tripping due to the detection of the same fault condition, the processor 50 of MCCB 42 may transmit an interlock signal to the upstream ACB 26 causing the ACB 26 to execute instructions that prevents the interruption of electrical power to the facility 28. The data received from current sensor 52 may be displayed on a user interface 46 coupled to processor 50 via display conduits 62 and keyboard conduit 64.

In addition to being coupled to one or more components within system 20, processor 50 may also be coupled to external computer networks such as a local area network (LAN) and the Internet. The LAN interconnects one or more remote computers, which are configured to communicate with processor 50 using a well-known computer communications protocol such as TCP/IP (Transmission Control Protocol/Internet(^) Protocol), RS-232, ModBus, and the like.

Referring now to FIG. 2, a schematic diagram of processor 50 is shown. Processor 50 includes a central processing unit or controller 66 coupled to a random access memory (RAM) device 68, a non-volatile memory (NVM) device 70, a read-only memory (ROM) device 72, one or more input/output (I/O) controllers 74 and data communications device 76 to interface with data transmission media 60.

I/O controllers 74 are coupled to sensors 78 that monitor the operation of the circuit breaker and the user interface 46 for providing digital data between these devices and data bus 80. I/O controllers 74 are also coupled to analog-to-digital (A/D) converters 82, which receive analog data signals from sensor 78.

Data communications device 76 provides for communication between processor 50 and data transmission media 60 in a data communications protocol supported by data transmission media 60. ROM device 70 stores an application code, e.g., main functionality firmware, including initializing parameters, and boot code, for controller 66. Application code also includes program instructions as shown in FIG. 4 for causing controller 66 to execute any circuit breaker operation control methods, including activating the circuit breaker operating mechanism, generating alarms, and delaying tripping in response to receiving an interlock signal.

NVM device 70 is any form of non-volatile memory such as an EPROM (Erasable Programmable Read Only Memory) chip, a disk drive, or the like. Stored in NVM device 70 are various operational parameters for the application code. The various operational parameters can be input to NVM device 70 either locally, using a keypad or alternatively a remote computer. It will be recognized that application code can be stored in NVM device 70 rather than ROM device 72.

Figure 6:
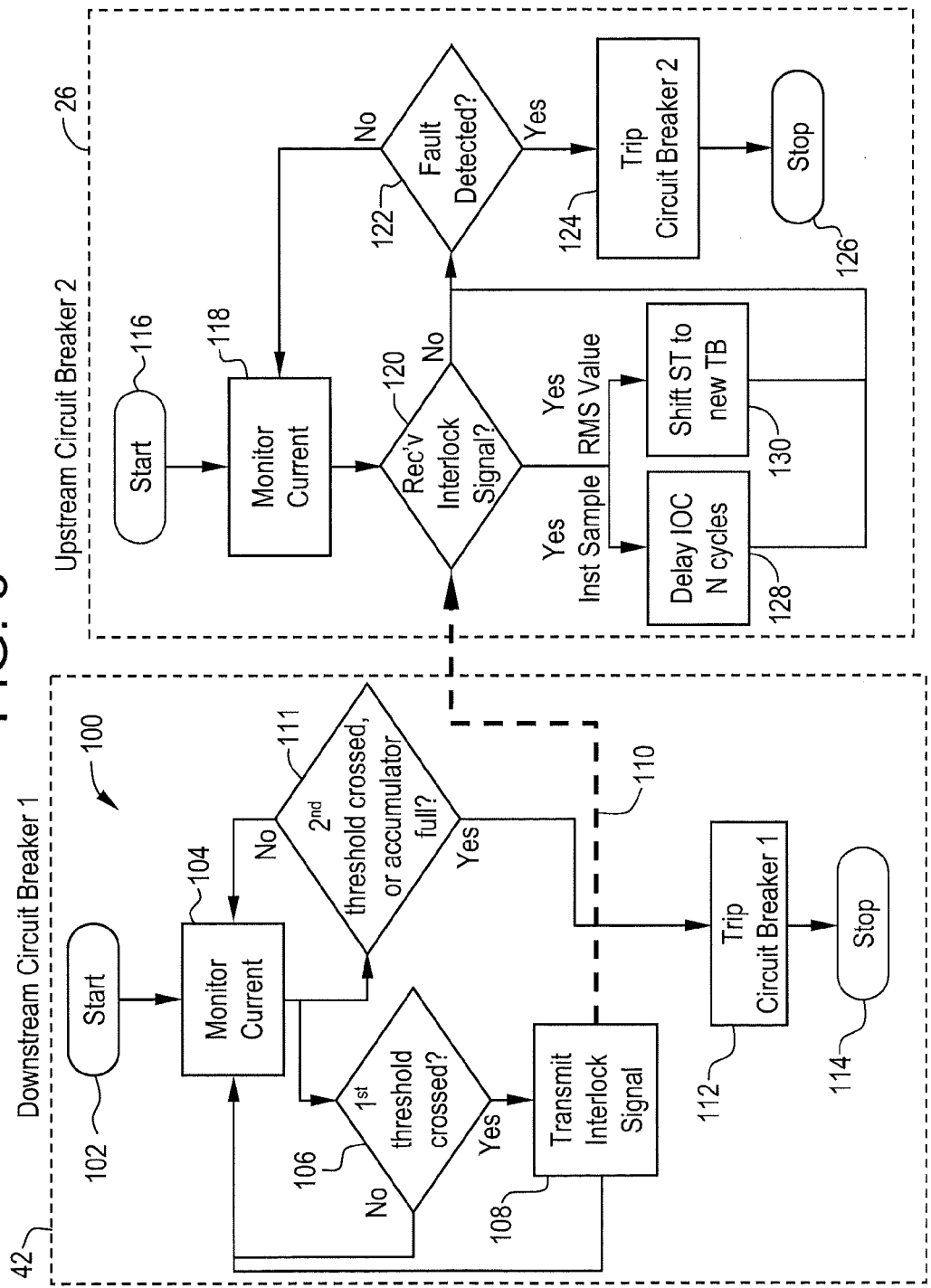

Processor 50 includes operation control methods embodied in application code shown in FIG. 6. These methods are embodied in computer instructions written to be executed by controller 66, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, PHP, Perl, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

The NVM 70 in the trip units 48, 54 includes data on parameters for the operation of the circuit breakers 26, 42, 44. This data includes trip curves 84, 86 such as illustrated in FIG. 3. These trip curves 84, 86 define a boundary between desired and undesired current levels as a function of time. For exemplary purposes herein, the trip curve 84 represents the trip curve for a downstream circuit breaker, while the trip curve 86 represents the trip curve for the upstream circuit breaker. A number of different types of faults may occur in an electrical distribution system. As is well known in the art, the trip curves 84, 86 are graphically represented by a "band" or range that takes into account factors such as, but not limited to sensor tolerances and mechanical reaction times. One type, often referred to as an overload region 88, causes the circuit breaker 26, 42, 44 to trip if an elevated current level exists for too long a period of time. An overload may occur, if a number of devices, such as motors or compressors for example, start at the same time resulting in a transient elevation of the electrical current in the circuit. The curvature of the trip curve in the overload region is intended to allow the circuit breaker to maintain its functionality without undesired or "nuisance" tripping due to transient conditions. At a certain current level, commonly referred to as the short time pickup region 96, 98 the reaction time of the circuit breaker decreases due to higher fault levels that create the potential for damaging the wiring within the electrical distribution system. Further along the trip curve is a region commonly referred to as an instantaneous pickup region 90. Due to the magnitude of the fault, the circuit breaker will trip with little to no appreciable delay. The instantaneous region is intended to trip the circuit breaker when a high level fault, such as a short circuit condition for example, occurs. The final region trip curve is referred to as an "override" region 97, 99. The purpose of the override region is to prevent damage to the circuit breaker. It should be appreciated that while FIG. 3 illustrates a single pair of trip curves, each of the circuit breakers 26, 42, 44 may have a different trip curves depending on the size of the circuit breaker and aspects of the circuits to which it is attached. Further, not all circuit breakers will incorporate all of the regions discussed above. For example, the override region 97, 99 is not utilized by all circuit breakers. The trip units 48, 54 may also detect other fault conditions, such as where ground fault thresholds are exceeded, or long time RMS or overload thresholds are exceeded.

In the exemplary embodiment, the circuit breakers 26, 42, 44 allow the operator to define a trip curve 86 for their particular application. The user defined trip curve 86 provides advantages in allowing the operator to more precisely define the coordination between the ACB 26, the MCCB 42, and the MCCB 44. As illustrated in FIG. 3 and FIG. 4, the operator may modify the trip curve 86 to create a user defined trip curve 93. The operator may define a short time pickup 95 and an instantaneous pickup 89. The time delay in region 91 may also modified to further control the reaction time of the circuit breaker. In general, the override region 97, 99 is not user definable and remains the same. As will be discussed in more detail below, the user defined trip curve 86 also allows the operator to use a zone selective interlock system utilizes different features depending on the type and level of the fault in the short time region and in the instantaneous regions of the trip curves.

An exemplary embodiment method for the coordination and zone selective interlock system between the circuit breakers will be described in reference to FIG. 6. It should be appreciated that while the description discusses the operation with reference to ACB 26 and MCCB 42, this is for exemplary purposes only. The same operation may also be applied between the MCCB 42 and MCCB 44, or ACB 26 and the MCCB 44 without deviating from the intended scope of the claimed invention.

The operation process 100 of trip unit 54 of downstream MCCB 42 starts in block 102 and proceeds to monitor the electrical current flowing through the MCCB 42 in block 104. Process 100 then proceeds to decision block 106 where it is determined if a first threshold has been crossed. The threshold that is compared against is user selectable. The threshold may be the root mean square ("RMS") value of the short time region 96. The threshold may also be based on a sample value in the instantaneous trip region 90. The user further has the option of selecting both the RMS short time value, or the instantaneous sample value, in which case if either parameter is satisfied, the decision block 106 provides an affirmative response. Referring to FIG. 3, the current RMS value is triggered in the range indicated by arrow 85, while the instantaneous sample value is triggered in the range indicated by arrow 83.

If the threshold condition in the instantaneous region 90 is not detected, a negative response results in block 106. Thus the process 100 loops back to block 104 and continues monitoring the electrical current. It should be appreciated that the process 100 will also include steps for monitoring overload region 88 type of faults as is well known in the art.

If an affirmative response is received in block 106, the process 100 moves on to block 108 where a selective interlock signal, represented by line 110, is immediately transmitted to upstream ACB 26 which will take further action as discussed below. After transmitting the signal, the process 100 proceeds to block 104 to continue monitoring the current.

In parallel with first threshold decision block 106, process 100 also compares the measured current values against a second criteria in block 111. Decision block 111 determines if the instantaneous region threshold 90 has been crossed, or if the "accumulator" for the short time region threshold 96 has been exceeded. Since the input current in the short time region 96 may vary, the short time trip algorithm uses an accumulator to determine the number of times the threshold has been crossed over a period of cycles. Once the accumulator has been filled, or if the instantaneous threshold has been crossed, decision block 111 returns an affirmative response and proceeds to block 112. In block 112 the trip unit 54 activates the operating mechanism of the MCCB 42 causing the main contacts to separate and the interruption of the electrical current downstream from MCCB 42. The process 100 stops at block 114 and awaits the operator taking corrective measures for clearing the detected fault condition. If decision block 111 returns a negative, the process 100 returns to block 104 and monitors the current.

The trip unit 48 of upstream circuit breaker, ACB 26, operates independently of and in parallel with the trip unit 54 of MCCB 42. The process 116 of operating trip unit 48 begins in start block 118 and proceeds to query block 120 where it is determined if a selective interlock signal 110 has been received from downstream circuit breaker MCCB 42. In the exemplary embodiment, the selective interlock signal 110 is an interrupt on the controller 66 in the trip unit 48 of the upstream ACB 26. This allows the steps within process 116 that react to selective interlock signal 110 to quickly take priority within the operations of the ACB 26.

If query block 120 results in a negative, the process 116 proceeds to query block 122 where the controller 66 uses the factory defined trip curve 84 to determine if a fault in the overload or instantaneous region has been detected. If query block 120 results in a negative, the process 116 loops back to block 118 and continues to monitor the electrical current. If query block 120 results in a positive, the ACB 26 activates its operating mechanism in block 124 resulting in the opening of the main contacts and the interruption of electrical current downstream from the ACB 26. The process 116 then stops in block 126 and awaits the operator taking corrective action.

If the selective interlock signal 110 is received, query block 120 returns a positive response. Since the operator may chose different thresholds or a combined threshold in decision block 106, process 116 bifurcates the interlock sequence response to the interlock signal 110 depending one which thresholds where crossed in decision block 106. If the interlock signal 110 is due to a current sample value in the instantaneous region 90, process 116 proceeds to block 128. Block 128 delays the response of the ACB 26 for a predetermined number of electrical cycles (as determined by the electrical frequency) before taking further response. The process 116 then proceeds on to block 122 and uses trip curve 86 for determining if a fault is occurring.

If the interlock signal 110 is due to a short time current RMS value, the process 116 proceeds to block 130, switches the trip curve used by the controller 66 from the factory set trip curve 86 to the user-defined trip curve 93. It should be appreciated that while the shifting to user-defined trip curve 86 also has the effect of delaying the response of ACB 26 and allowing the downstream circuit breaker the opportunity to clear the fault. This is accomplished since the user defined short time region 95, the time delay region 91 and the instantaneous region 89 do not overlap with the trip curve 84 of the downstream circuit breaker. After adjusting the response delay in block 128 or changing from the factory set trip curve 84 to the user-defined trip curve 93 in block 130, the process 116 loops back to query block 122. Here it is determined if a fault has been detected. It should be appreciated that if the trip curve has been changed to user-defined trip curve 93, query block 122 uses the user-defined trip curve 93 to determine if there is an undesired electrical condition, otherwise trip curve 84 is used. This arrangement provides the advantage that in the event the downstream circuit breaker, MCCB 42, is unable to adequately clear the electrical fault, the upstream circuit breaker, ACB 26, can provide the electrical current interruption functionality. As described above, if the electrical fault is detected, the ACB operating mechanism is activated in block 124, the current interrupted and process 116 stops in block 126. It should further be appreciated that if the upstream circuit breaker ACB 26 detects a fault in the range indicated by arrow 87 (FIG. 4), the ACB 26 will react to the fault regardless which interlock signal 110 was transmitted. If no electrical fault is detected, the process 116 loops back to monitor the current in block 118.

It should be appreciated that the processes 100, 116 may occur between any downstream circuit breaker and upstream circuit breaker. Further, a circuit breaker, such as MCCB 42, may be positioned in between the downstream breaker 44 and the ACB 26. In this embodiment, the MCCB 44 would issue the selective interlock signal 110 and both the MCCB 42 and the ACB 26 would follow process 116 and modify their operations accordingly.

It should be appreciated that the zone selective interlock system and method for coordination of a circuit breaker system in the event of an electrical fault in the instantaneous region described herein provides advantages to the design, operation and maintenance of the electrical distribution network. The system and method allows the trip curves to be customized by the operator to provide coordination functions in the manner desired for the application. The system and method also provides advantages in a faster response time by the upstream breaker in the event of a high level fault. The system and method further provide advantages in maintaining desired functionality of the circuit breaker system as the electrical distribution system and its attached loads change over time.

The capabilities of the embodiments disclosed herein can be implemented in software, firmware, hardware or some combination thereof. As one example, one or more aspects of the embodiments disclosed can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the disclosed embodiments can be provided.

Further, the diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A circuit breaker zone selective interlock system comprising:
    a first current sensor;
    a first processor electrically coupled to said first current sensor, said first processor being responsive to computer executable instructions to transmit an interlock signal in response to detecting a first fault condition with said first current sensor, said first processor being further responsive to computer executable instructions for transmitting said interlock signal in response to detecting a second fault condition with said first current sensor, wherein said first processor is further responsive to computer executable instructions to trip a first circuit breaker in response to detecting said first fault condition;
    a second current sensor;
    a second processor electrically coupled to said second current sensor and coupled for communication with said first processor, said second processor being responsive to computer executable instructions to change a trip curve parameter to a user-defined trip curve parameter in response to said interlock signal due to said first fault condition, wherein said second processor is further responsive to computer executable instructions to delay a tripping response in response to said interlock signal due to said second fault condition, wherein said second processor is further responsive to computer executable instructions to trip a second circuit breaker in response to said second current sensor detecting a current level at or above an instantaneous trip threshold parameter, wherein said second fault condition is a fault having a current value in the instantaneous region of the trip curve parameter.

2. The circuit breaker zone selective interlock system of claim 1 wherein said first fault condition is a short time RMS current threshold.

3. The circuit breaker zone selective interlock system of claim 1 wherein said second processor is responsive to executable computer instructions to a receive signal from a user interface to change a length of said delay in tripping response.

4. The circuit breaker zone selective interlock system of claim 3 wherein said second processor is responsive to executable computer instructions to receive a signal from said user interface to activate said first fault condition or said second fault condition.

5. The circuit breaker zone selective interlock system of claim 3 wherein said second processor is responsive to executable computer instructions to receive a signal from said user interface to activate said first fault condition and said second fault condition.

* * * * *